Dec. 27, 1938.　　　J. MOCHARNUK　　　2,142,002
CITROUS FRUIT JUICE EXTRACTOR
Filed Sept. 24, 1937　　　2 Sheets-Sheet 1

Inventor
John Mocharnuk

By Clarence A. O'Brien
Hyman Berman
Attorneys

Dec. 27, 1938.   J. MOCHARNUK   2,142,002
CITROUS FRUIT JUICE EXTRACTOR
Filed Sept. 24, 1937   2 Sheets-Sheet 2
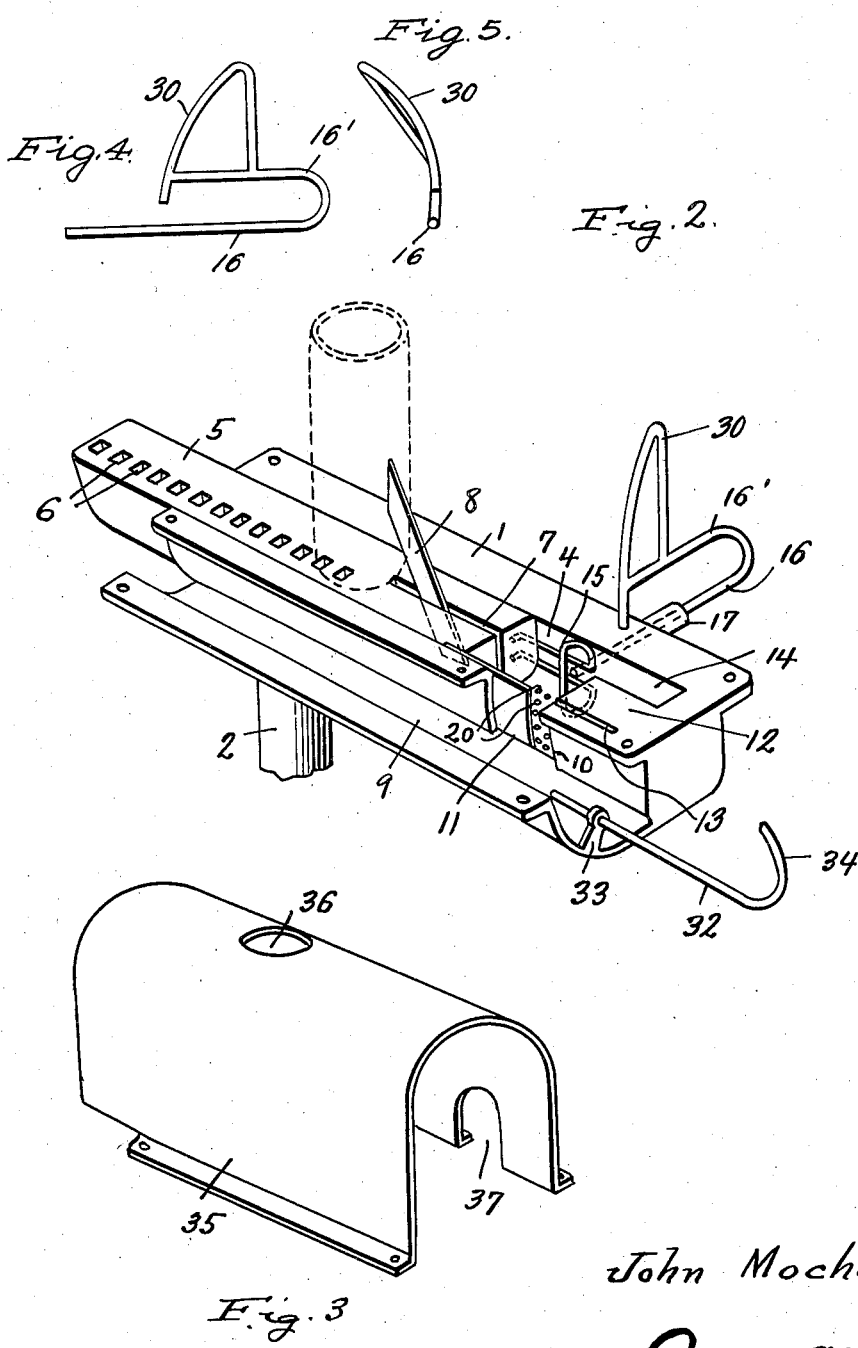
Inventor
John Mocharnuk
By Clarence A. O'Brien
Hyman Berman
Attorneys Patented Dec. 27, 1938

2,142,002

UNITED STATES PATENT OFFICE 2,142,002

CITROUS FRUIT JUICE EXTRACTOR

John Mocharnuk, McCamey, Tex., assignor of one-half to D. Crockett Fisher, McCamey, Tex.

Application September 24, 1937, Serial No. 165,589

3 Claims. (Cl. 100—42)

This invention relates to means for extracting the juice from citrous fruit, the general object of the invention being to provide means operated by a single hand lever for first permitting a fruit to drop from a hopper into a channel member, then forcing a fruit against a knife to cut the fruit in half, after which the juice is squeezed from the halves and the hulls ejected into a container.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a view of the internal parts with the upper portions removed.

Figure 3 is a view of the cover member.

Figure 4 is an elevation of the feeder member.

Figure 5 is a view looking toward the inner end of the feeder member.

Figure 1:
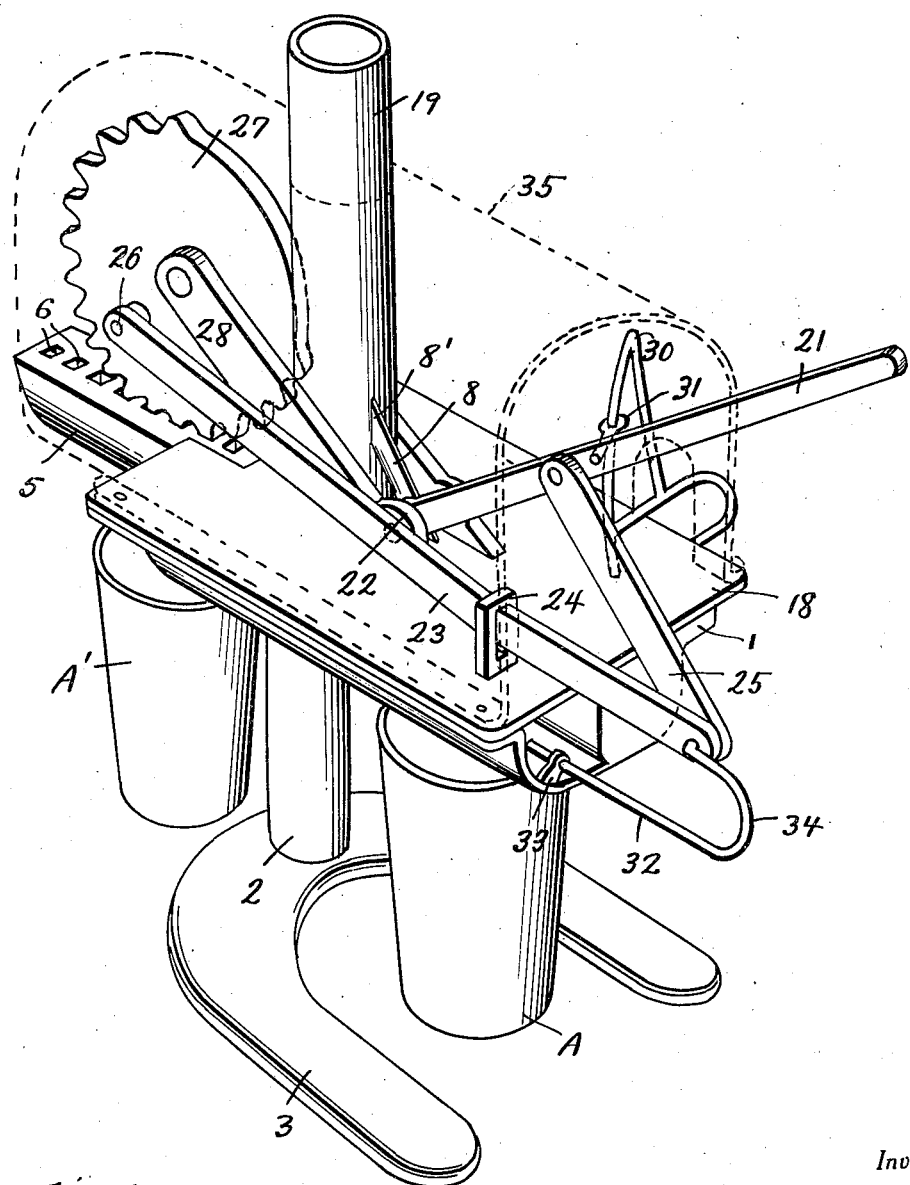
Figure 1 is a perspective view of the invention with the cover shown in phantom for clearness of illustration.

In these drawings, the numeral 1 indicates an elongated horizontally arranged body member which is supported on a post 2 rising from a base 3 which can be fastened to a table or any other suitable support, the parts being so arranged that a juice receiving glass A or the like can be placed in position to receive the juice extracted by the device and also a second glass A' or the like can be positioned to receive the hulls of the fruit after the juice has been extracted therefrom.

The member 1 is formed with a channel 4 in which slides a rack bar 5, the teeth of which are formed by the recesses 6 in its upper face and the front end of the bar is provided with the vertical slot 7 for the passage of a knife 8. Said body member 1 is also formed with a longitudinally extending channel 9 which is placed to one side of the channel 4 and an opening 10 in the separating wall between these channels places the front portions of the two channels in communication with each other. A door forming part 11 is connected with the front end of the rack bar 5 for closing the opening when the rack is in its forward position. A portion 12 of the body member extends into the front end of the channel 4 and has a slot 13 therein for receiving the front end of the door member 11. This member 12 forms an abutment or stationary jaw against which the fruit is squeezed by the front end of the rack bar or plunger 5 and a pocket or recess 14 forms a continuation of half of the channel 4 and lies alongside the part 12, this pocket being adapted to receive one-half of a fruit while the other half is being squeezed. A wire member 15 extends forwardly from the front end of the plunger 5 and includes a pair of spaced parallel shank forming portions and a laterally extending head portion, this member acting to hold a half fruit between the head part and the front end of the plunger, the head part acting to move the half fruit back out of the pocket after the same has been moved into the pocket by forward movement of the plunger. A feeder rod 16 is slidably arranged in a sleeve 17 which projects from a side of the body member 1 and the inner end of the rod is arranged to pass between the limbs of the wire member 15 so as to force the half fruit from said wire member into position where it will be squeezed between the plunger and the part 12 upon forward movement of the plunger. This rod also acts to eject the half fruits through the opening 10 into the channel 9 as will be hereinafter described.

A cover plate 18 covers the body member and is suitably connected therewith and a vertically arranged hopper 19 has its lower end placed in a hole in the cover member, this hopper being arranged over the channel 4 so that when the plunger or rack bar 5 is retracted a fruit will drop from the hopper into the channel 4 and then when the rack bar plunger is moved forward the front end thereof will press this fruit against the inclined knife 8, which passes through the cover member and has its upper end fastened to the hopper as shown at 8'. Thus the fruit will be cut by the knife and upon continued forward movement of the plunger or rack bar 5 the slot 7 will receive the knife and one-half of the fruit will be held between the front end of the plunger and the head of the member 15 while the other half will be forced against the end of the part 12 and thus this half will be squeezed and the juice will pass through the perforations 20 in the bottom of the channel 4 and drop into the glass or receptacle A which is placed under said perforations. The head of the member 15 and the other half of the fruit will enter the pocket 14 while the other half is being squeezed between the plunger and the part 12.

A hand lever 21 is pivoted at its lower end to a part 22 extending upwardly from the cover 18 and a bar 23 is slidably supported by a guide 24 on the cover. A link 25 connects the front end of the bar with an intermediate part of the lever 21 and the other end of the bar is eccentrically connected, as shown at 26 with a toothed wheel 27 rotatably supported by the bracket 28 rising from the cover 18. The teeth of this wheel 27 engage the recesses 6 so that the rack bar will be reciprocated by movement of the wheel and as will be seen the wheel will be partly rotated in one direction when the hand lever 21 is raised and in an opposite direction when the hand lever is lowered.

The outer part of the rod 16 is bent into U-shape with the second limb 16' thereof extending over the cover plate and an upright substantially V-shaped rod 30 is connected with said limb and an eye member 31 carried by an intermediate part of the lever 21 slidably receives one of the limbs of the member 30 so that when the lever is moved upwardly the eye member moving upwardly on the outwardly and upwardly sliding limb of the member 30 will move the parts inwardly so that the rod 16 will enter the channel 4 and on downward movement of the lever 21 the parts move outwardly so that the rod 16 moves out of the channel. Of course, the rod 16 is also rotatably arranged in the sleeve 17 so that the parts can partly rotate as they move inwardly and outwardly by the movement of the lever 21.

An ejector rod 32 is guided for movement in the channel 9 by the guide 33 and the outer end of the rod is bent into U-shape as shown at 34 and fastened to the end of the rod 23 so that the ejector rod is reciprocated with the bar 23.

A hood 35 covers the parts, as shown in dotted lines in Figure 1 and said hood has an opening 36 therein for the passage of the hopper and a side opening 37 for the passage of the bight of the U-shaped part formed by the portions 16, 16'.

The device can be made of various sizes to suit the particular kind of fruit for which it is intended to be used. For instance, if the device is used for limes it is to be made much smaller than if it is to be used for oranges.

The fruit is placed in the hopper 19 and when this is done the lower fruit will rest on the top of the plunger 5. Then the lever 21 is lifted which causes rotary movement of the wheel 27 which, in turn, moves the plunger outwardly so that a fruit will drop from the hopper into the channel 4. Then the lever 21 is pressed downwardly which rotates the wheel 27 in an opposite direction and causes it to move the rack bar or plunger 5 inwardly which pushes the fruit against the knife, causing the knife to cut the fruit in half and then the two halves are pressed forwardly by the plunger until finally one-half is pressed between the plunger and the inner end of the part 12, the juice from this part passing through the holes 20 into the glass A and the other half entering the pocket 14. Just before the squeezing operation occurs the door 11 closes the opening 10. Then when it is desired to squeeze the other half the lever 21 is partly raised so as to retract the plunger and this causes the head of the member 15 to move the unpressed part of the fruit rearwardly and this lifting of the lever 21 causes the rod 16 to press the said unpressed part of the channel and this action presses the hull of the fruit through the opening 10 into the channel 9, it being understood that the door 11 is open. Then the handle 21 is moved downwardly again so as to cause the plunger to press the second half of the fruit against the part 12. Then the lever 21 is lifted again all the way so as to entirely retract the plunger and this action will cause the rod 16 to force the other half of the fruit through the opening 10 into the channel 9 where it is engaged by the rod 32 which forces it through the channel 9 past the opening 10, and each time a squeezed half of fruit is forced through the door 10 by the rod 16, the rod 32 pushes the hulls along the channel 9 until a sufficient number of hulls has been placed in the channel 9 to cause the first one placed in said channel to drop from the end of the channel into the receptacle A'. Then the parts are in condition to repeat.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:—

1. A device of the class described comprising a body member having a pair of parallel channels therein with an opening causing one channel to communicate with the other, a plunger arranged in one channel part and having a door part at its front end closing the opening when the plunger is in its forward position, a hopper, the bottom of which is uncovered when the plunger is retracted for permitting a fruit to drop therefrom into the channel, a knife extending into the said channel for cutting the fruit into halves when the plunger forces the fruit against the knife, said plunger pressing the cut fruit against an end part of the channel for pressing the juice therefrom, said channel having perforations in its bottom, manually operated means for reciprocating the plunger, means actuated from such means for forcing the pressed fruit through the door controlled opening into the second channel and means also operated by the manually operated means for forcing the pressed fruit through the second channel.

2. A device of the class described comprising a body having a channel therein, the bottom wall of which is formed with perforations adjacent one end thereof, a projection in said end spaced from a side wall of the channel to form a pocket, a plunger in the channel having a portion of its inner end adapted to squeeze fruit between itself and the projection, the juice escaping through the perforations, a knife member extending into the channel and against which the fruit is pressed by the plunger for cutting the fruit into halves, a member for holding one-half of the fruit between itself and another part of the inner end of the plunger, said member guiding the said half of the fruit into the pocket when the other half is being pressed and moving said half out of the pocket upon retraction of the plunger, manually operated means for reciprocating the plunger and means actuated by the manually operated means for moving the unpressed half of the fruit into pressing position upon partial retraction of the plunger and said means also ejecting the previously pressed half of the fruit.

3. A device of the class described comprising a body member having a channel therein having its front end closed and a projection at said end forming a pocket between itself and the opposite wall of the channel, the bottom of the channel having perforations therein adjacent the inner end of the projection, a plunger sliding in the channel and having a vertical slit in its inner end, a knife extending into the channel and entering the slit on forward motion of the plunger, a portion of the inner end of the plunger acting to squeeze a half fruit between itself and the inner end of the projection, a member connected with the inner end of the plunger for entering the pocket and for holding the other half of the fruit while the first half is being squeezed, one wall of the channel having an opening therein, a second channel communicating with the first through said opening, a door member connected with the front end of the plunger for closing the opening upon forward movement of the plunger, a vertically arranged hopper for delivering fruit into the channel, a fruit dropping from the hopper into the channel upon retraction of the plunger, said plunger having rack teeth therein, a wheel supported by the body and having teeth engaging the rack teeth, a hand lever, a sliding rod having one end eccentrically pivoted to the wheel, a link connecting the other end to the hand lever, an ejector member connected with the sliding rod operating in the second channel for ejecting fruit hulls therefrom, a feeder rod for forcing a half fruit from one side of the first channel to the opposite side and over the perforated part and also for forcing hulls through the door controlled opening and means for operating said rod by the hand lever.

JOHN MOCHARNUK.